United States Patent
Lee et al.

(10) Patent No.: US 10,273,908 B2
(45) Date of Patent: Apr. 30, 2019

(54) ENGINE SYSTEM

(71) Applicant: Hyundai Motor Company, Seoul (KR)

(72) Inventors: Joowon Lee, Gwangju-si (KR); Jong Il Park, Seoul (KR); Kwanhee Choi, Seoul (KR); Hyungbok Lee, Seongnam-si (KR); Dong Hee Han, Seoul (KR); Hyun Jun Lim, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/377,730

(22) Filed: Dec. 13, 2016

(65) Prior Publication Data

US 2018/0030934 A1 Feb. 1, 2018

(30) Foreign Application Priority Data

Jul. 26, 2016 (KR) ........................ 10-2016-0094742

(51) Int. Cl.
*F02B 33/44* (2006.01)
*F02M 26/08* (2016.01)
(Continued)

(52) U.S. Cl.
CPC ............ *F02M 26/08* (2016.02); *F01N 13/107* (2013.01); *F02B 37/04* (2013.01); *F02B 37/16* (2013.01);
(Continued)

(58) Field of Classification Search
CPC ........ F02M 26/06; F02M 26/15; F02M 26/22; F02B 37/04; F02B 37/001; F02B 37/004; F02B 37/007; F02B 37/013; F02B 37/16
(Continued)

(56) References Cited

U.S. PATENT DOCUMENTS 9,121,338 B1 * 9/2015 Wu ...................... F02B 37/007
2008/0092861 A1 * 4/2008 Duffy .................... F01N 3/023
123/568.12
(Continued)

FOREIGN PATENT DOCUMENTS

JP 2011-241713 A 12/2011
JP 2012-077706 A 4/2012
(Continued)

*Primary Examiner* — Ngoc T Nguyen
(74) *Attorney, Agent, or Firm* — Morgan, Lewis & Bockius LLP (57) ABSTRACT

An engine system may include an engine having an intake line flowing an intake gas supplied to the combustion chambers; an intake manifold; a throttle valve provided at a front of the intake manifold and controlling an air amount supplied to the combustion chamber; an electric supercharger provided at the throttle valve and including a motor and an electric compressor operated by the motor to supply the supercharged air to the combustion chamber; an exhaust gas processing device purifying an exhaust gas generated in the combustion chamber; and an exhaust gas recirculation device including a recirculation line branched from the downstream portion of the exhaust gas processing device and joined to the intake line of the upstream portion of the electric compressor, an EGR cooler mounted at the recirculation line, and an EGR valve mounted at a part where the recirculation line and the intake line are joined.

11 Claims, 5 Drawing Sheets

(51) Int. Cl.
*F02M 26/15* (2016.01)
*F02M 26/17* (2016.01)
*F02M 26/22* (2016.01)
*F02B 37/04* (2006.01)
*F02B 37/16* (2006.01)
*F02D 9/02* (2006.01)
*F02D 41/00* (2006.01)
*F01N 13/10* (2010.01)
*F02B 37/18* (2006.01)
*F02B 39/10* (2006.01)

(52) U.S. Cl.
CPC ............ *F02B 37/183* (2013.01); *F02B 39/10* (2013.01); *F02D 9/02* (2013.01); *F02D 41/0007* (2013.01); *F02D 41/0087* (2013.01); *F02M 26/15* (2016.02); *F02M 26/17* (2016.02); *F02M 26/22* (2016.02); *F01N 2340/06* (2013.01); *F02B 2037/162* (2013.01); *Y02T 10/144* (2013.01)

(58) Field of Classification Search
USPC ............... 60/605.2, 611; 123/568.11, 568.12
See application file for complete search history.

(56) References Cited

U.S. PATENT DOCUMENTS

| 2015/0361872 | A1* | 12/2015 | Takaki | F02D 21/08 |
| | | | | 123/568.11 |
| 2016/0363070 | A1* | 12/2016 | Hotta | F02D 41/0047 |
| 2017/0045008 | A1* | 2/2017 | Takaki | F02M 26/00 |

FOREIGN PATENT DOCUMENTS

| JP | WO 2014119182 A1 * | 8/2014 | ............. F02D 21/08 |
| JP | WO 2015071723 A2 * | 5/2015 | ......... F02D 41/0065 |
| KR | 10-1557018 B1 | 10/2015 | |

* cited by examiner

ENGINE SYSTEM

CROSS-REFERENCE TO RELATED APPLICATION

The present application claims priority to Korean Patent Application No. 10-2016-0094742 filed on Jul. 26, 2016, the entire contents of which is incorporated herein for all purposes by this reference.

BACKGROUND OF THE INVENTION

Field of the Invention

The present invention relates to an engine system. More particularly, the present invention relates to an engine system minimizing an exhaust gas recirculation path.

Description of Related Art

An engine of a vehicle combusts a mixture of air inflowing from the outside and a fuel with an appropriate ratio to generate power.

In a process of generating the power by driving the engine, the external air for the combustion must be appropriately supplied to obtain a desired output and combustion efficiency. For this, a turbocharger as a device for turbocharging the air for the combustion to increase the combustion efficiency of the engine is used.

In general, a turbocharger is a device that rotates a turbine by using pressure of exhaust gas discharged from an engine and thereby increases output of the engine by supplying high-pressure air to a combustion chamber by using rotational force thereof. The turbocharger is applied to most diesel engines and has also recently been applied to gasoline engines.

Further, a nitrogen oxide (NOx) included in the exhaust gas is regulated as an atmospheric pollution source and there has been an effort to lessen exhaust of NOx.

An exhaust gas recirculation (EGR) system has been provided to a vehicle for reducing noxious exhaust gas. Generally, NOx is increased in a case where an air-fuel ratio of an air-fuel mixture is high, which is necessary for sufficient combustion. Thus, the exhaust gas recirculation system mixes exhaust gas from an engine with the air-fuel mixture, for example at 5-20%, thereby reducing the amount of oxygen in the air-fuel mixture and obstructing combustion, and so lessening generation of NOx.

As a representative exhaust gas recirculation system, there is a low pressure exhaust gas recirculation (LP-EGR) device. The low pressure exhaust gas recirculation device recirculates the exhaust gas passing through a turbine of the turbocharger into an intake pathway of a front stage of a compressor.

A recirculation path of the low pressure exhaust gas recirculation device according to a conventional art is as follows.

A recirculation line of the low pressure exhaust gas recirculation device according to the conventional art is branched from a rear end of a catalyst purifying the exhaust gas and is joined to a front end of a compressor of the turbocharger. Also, an EGR cooler is mounted on the recirculation line to cool the recirculation gas, and an EGR valve is mounted on the recirculation line to control a recirculation gas amount.

The recirculation line is joined to an intake line flowing fresh air from the outside. Also, the recirculation gas flowing in the recirculation line and the fresh air flowing in the intake line are compressed by the compressor and are supplied to a combustion chamber of the engine via an intercooler, a throttle valve, and an intake manifold.

An exhaust gas recirculation path of the engine according to the conventional art is configured of the catalyst rear end→EGR valve→compressor→intercooler→intake manifold such that the exhaust gas recirculation path is very long.

The exhaust gas recirculation amount is controlled by an opening of the EGR valve, and if the exhaust gas recirculation path is long, a time taken to move the recirculation gas from the EGR valve to the combustion chamber is increased.

Accordingly, a time delay is generated when controlling the recirculation gas amount supplied to the combustion chamber such that there is a problem that an error of an EGR ratio is increased.

Also, because realization of a controller to solve the error of the EGR rate is complicated, there is a problem that control performance to control the correct EGR rate in a transitional period is deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an engine system minimizing the exhaust gas recirculation path.

Various aspects of the present invention are directed to providing an engine system correctly controlling the EGR rate in the transitional period by minimizing the exhaust gas recirculation path.

An engine system according to an exemplary embodiment of the present invention includes: an engine including a plurality of combustion chambers generating a driving torque by combustion of a fuel; an intake line flowing an intake gas supplied to the combustion chambers; an intake manifold distributing the intake gas flowing through the intake line into the plurality of combustion chambers; a throttle valve provided at a front of the intake manifold and controlling an air amount supplied to the combustion chamber; an electric supercharger provided at the upstream portion of the throttle valve and including a motor and an electric compressor operated by the motor to supply the supercharged air to the combustion chamber; an exhaust gas processing device purifying an exhaust gas generated in the combustion chamber; and an exhaust gas recirculation device including a recirculation line branched from the downstream portion of the exhaust gas processing device and joined to the intake line of the upstream portion of the electric compressor, an EGR cooler mounted at the recirculation line, and an EGR valve mounted at a part where the recirculation line and the intake line are joined.

A cylinder deactivation (CDA) device mounted at portion of the combustion chambers among the plurality of combustion chambers and selectively deactivating the portion of the combustion chambers; a first exhaust manifold connected to the combustion chambers mounted with the CDA device; a second exhaust manifold connected to the combustion chambers without the CDA device; and a turbocharger including a turbine rotated by exhaust gas exhausted through the first exhaust manifold and a compressor rotated in connection with the turbine to compress external air may be further included.

The combustion chambers may be included in a four-cylinder engine sequentially including four combustion chambers of a first combustion chamber, a second combustion chamber, a third combustion chamber, and a fourth combustion chamber, and the CDA device may be mounted at the second combustion chamber and the third combustion chamber.

The turbine may be mounted at the exhaust line flowing the exhaust gas exhausted from the first exhaust manifold.

A bypass line partially bypassing air supplied to the electric supercharger may be provided at the intake line, and a bypass valve may be mounted at the bypass line.

The second exhaust line connected to the second exhaust manifold and the first exhaust line connected to the first exhaust manifold may be joined to a main exhaust line, and the exhaust gas processing device may be provided at the main exhaust line.

The CDA device may be operated in a low speed region to deactivate the combustion chambers.

An engine system according to another exemplary embodiment of the present invention includes: an engine including a plurality of combustion chambers generating a driving torque by a combustion of a fuel; an intake line flowing an intake gas supplied to the combustion chambers; a throttle valve provided at a upstream portion of the intake manifold and controlling an air amount supplied to the combustion chamber; a cylinder deactivation (CDA) device mounted at a portion of the combustion chambers among the plurality of combustion chambers and selectively deactivating the portion of the combustion chambers; a first exhaust manifold connected to the combustion chambers mounted with the CDA device; a second exhaust manifold connected to the combustion chambers without the CDA device; a turbocharger including a turbine rotated by the exhaust gas exhausted through the first exhaust manifold and a compressor rotated in connection with the turbine to compress external air; an electric supercharger provided at the upstream portion of the throttle valve and including a motor and an electric compressor operated by the motor to supply supercharged air to the combustion chamber; and an exhaust gas recirculation device including a recirculation line branched from the first exhaust manifold and joined at the upstream portion of the electric compressor mounted at the intake line, an EGR cooler mounted at the recirculation line, and an EGR valve mounted at a part where the recirculation line and the intake line are joined.

The combustion chambers may be included in a four-cylinder engine sequentially including four combustion chambers of a first combustion chamber, a second combustion chamber, a third combustion chamber, and a fourth combustion chamber, and the CDA device may be mounted at the second combustion chamber and the third combustion chamber.

A bypass line partially bypassing air supplied to the electric supercharger may be provided at the intake line, and a bypass valve may be mounted at the bypass line.

The second exhaust line connected to the second exhaust manifold and the first exhaust line connected to the first exhaust manifold may be joined to a main exhaust line, and the exhaust gas processing device may be provided at the main exhaust line.

The CDA device may be operated in a low speed region to deactivate the combustion chambers.

According to the engine system according to an exemplary embodiment of the present invention, the exhaust gas recirculation path may be minimized such that the EGR ratio may be correctly controlled in the transitional period.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The drawings and description are to be regarded as illustrative in nature and not restrictive. Like reference numerals designate like elements throughout the specification.

Further, in the drawings, the sizes and thicknesses of the components are exemplarily provided for convenience of description, but the present invention is not limited those shown in the drawings, and the thicknesses are exaggerated to clearly show several parts and regions.

Now, an engine system according to various exemplary embodiments of the present invention will be described with reference to accompanying drawings.

Figure 1:
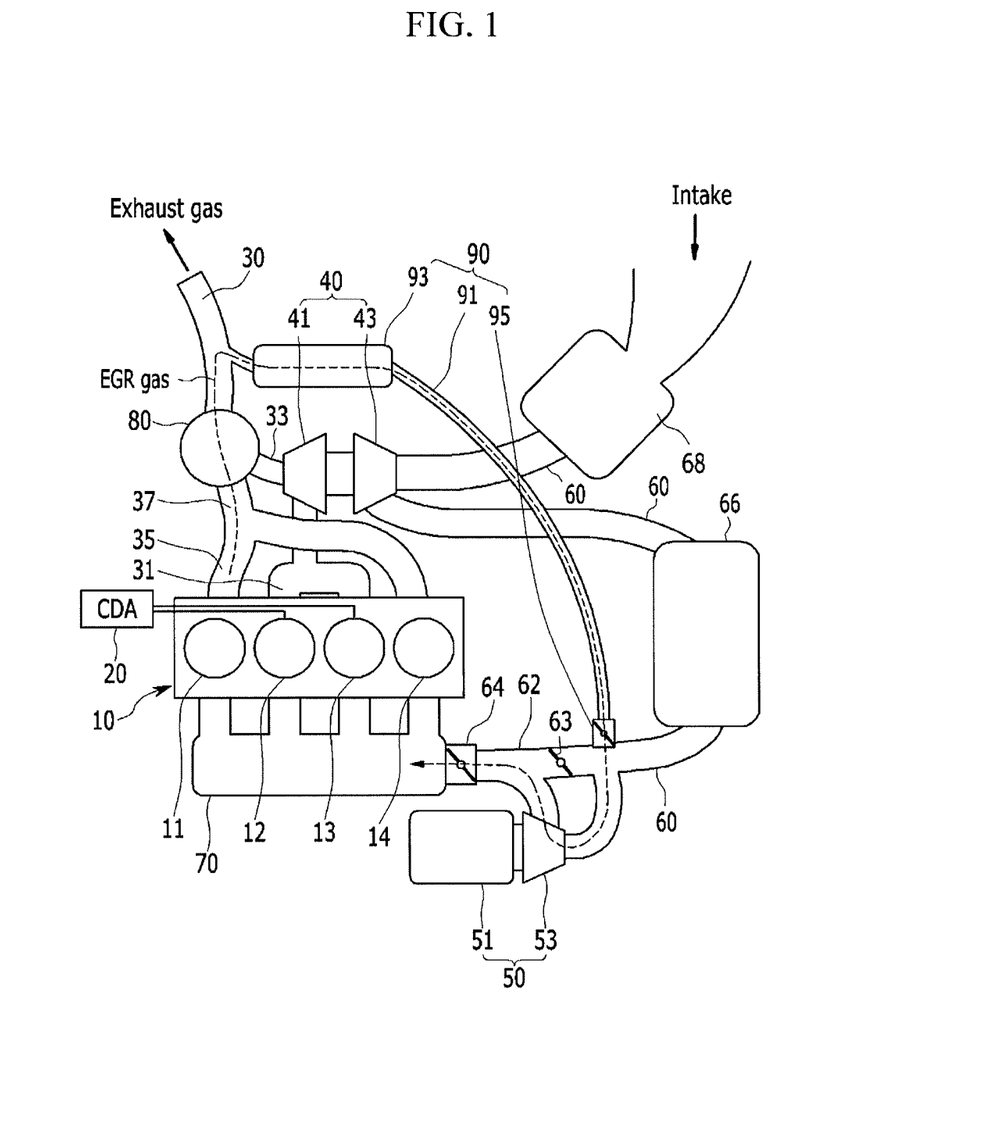
FIG. 1 is a schematic view showing a configuration of an engine system according to various exemplary embodiments of the present invention.

FIG. 1 is a schematic view showing a configuration of an engine system according various exemplary embodiments of the present invention.

As shown in FIG. 1, an engine system according to an exemplary embodiment of the present invention includes an engine 10 including a plurality of combustion chambers generating a driving torque by combustion of a fuel, an intake line 60 flowing an intake gas supplied to the combustion chamber, a throttle valve 64 provided at a upstream portion of an intake manifold 70 and controlling an air amount supplied to the combustion chamber, an electric supercharger 50 provided at a upstream portion of the throttle valve 64 and including a motor 51 to supply supercharged air to the combustion chamber and an electric compressor 53 operated by the motor 51, an exhaust gas processing device 80 purifying the exhaust gas generated in the combustion chamber, and an exhaust gas recirculation (EGR) device 90 resupplying a portion of the exhaust gas exhausted from the combustion chamber to the combustion chamber.

The combustion chamber of the engine 10 may be included in a four-cylinder engine having four combustion chambers. In a plurality of combustion chambers, a first combustion chamber 11, a second combustion chamber 12, a third combustion chamber 13, and a fourth combustion chamber 14 may be sequentially disposed.

The electric supercharger 50 to supply supercharged air to the combustion chamber includes the motor 51 and the electric compressor 53. The electric compressor 53 is operated by the motor 51, and compresses external air depending on a driving condition to be supplied to the combustion chamber.

In the intake line 60, a bypass line 62 bypassing a portion of air supplied to the electric supercharger 50 is provided. A bypass valve 63 is mounted on the bypass line 62. An amount of supercharged air of the electric supercharger 50 is controlled by control of the bypass valve 63.

The exhaust gas recirculation device 90 includes a recirculation line 91 flowing a part (a recirculation gas) of the exhaust gas exhausted from the combustion chamber, an EGR cooler 93 mounted at the recirculation line 91, and an EGR valve 95 controlling the recirculation gas amount.

The recirculation line 91 is branched from the downstream portion of the exhaust gas processing device 80 purifying the exhaust gas generated from the combustion chamber and is joined to the intake line 60, and preferably, is joined to the intake line 60 of the upstream portion (upstream side) of the electric compressor 53 mounted at the intake line 60.

The EGR cooler 93 cools the recirculation gas flowing in the recirculation line 91 to be supplied to the combustion chamber.

A distance between the EGR valve 95 and the combustion chamber may be minimized by installing the EGR valve 95 at a part where the recirculation line 91 and the intake line 60 are joined. As above-described, when the distance between the EGR valve 95 and the combustion chamber is minimized, when the recirculation gas amount is controlled by a controller (e.g., an engine control unit), the time delay is minimized such that control responsiveness is improved.

Meanwhile, the engine system according to the various exemplary embodiments of the present invention may further include a cylinder deactivation apparatus (CDA) selectively deactivating a portion of the combustion chambers, an exhaust manifold gathering the exhaust gas exhausted from the combustion chambers to the exhaust line, and a turbocharger 40 supplying turbocharged air to the combustion chamber.

The CDA (cylinder deactivation) device is mounted at the portion of the combustion chambers among the entire combustion chambers and selectively deactivates the portion of the combustion chambers. While the CDA device 20 is operating, the fuel is not supplied to the combustion chambers that are deactivation targets, and the operation of the intake valve and the exhaust valve is stopped. The CDA device 20 is disclosed in a Field of the Invention including the present invention and a description thereof is omitted.

The CDA device 20 is preferably mounted to the second combustion chamber 12 and the third combustion chamber 13 among four combustion chambers.

The exhaust manifold includes a first exhaust manifold 31 connected to the combustion chamber mounted with the CDA device 20 and a second exhaust manifold 35 connected to the combustion chamber to which the CDA device 20 is not mounted.

The first exhaust manifold 31 is connected to a first exhaust line 33, and the second exhaust manifold 35 is connected to a second exhaust line 37. The first exhaust line 33 and the second exhaust line 37 are joined to the main exhaust line 30. An exhaust gas processing device 80 purifying the exhaust gas is mounted at the main exhaust line 30 joined with the first exhaust line 33 and the second exhaust line 37.

The turbocharger 40 to supply the turbocharged air to the combustion chamber includes a turbine 41 rotated by the exhaust gas exhausted from the combustion chamber and a compressor 43 rotated in connection with the turbine 41 to compress the external air. In the instant case, the turbine 41 is connected to the first exhaust line 33 and is operated by the exhaust gas exhausted through the first exhaust manifold 31.

The compressor 43 of the turbocharger 40 and the electric supercharger 50 are provided to the intake line 60 inflowing the external air. An air cleaner 68 for filtering the inflowing external air is mounted at an entrance of the intake line 60. An intercooler 66 for cooling the external air inflowing from the outside is mounted at the intake line 60.

That is, the compressor 43 of the turbocharger 40 is disposed at an upstream side of the intake line 60, and the electric supercharger 50 is disposed at a downstream side of the intake line 60. The air in flowing through the intake line 60 is supplied to the combustion chamber through the intake manifold 70. An air amount supplied to the combustion chamber is controlled by the throttle valve 64 mounted at the entrance of the intake manifold 70.

Hereinafter, an operation of the engine system according to an exemplary embodiment of the present invention will be described with reference to accompanying drawings.

Figure 2:
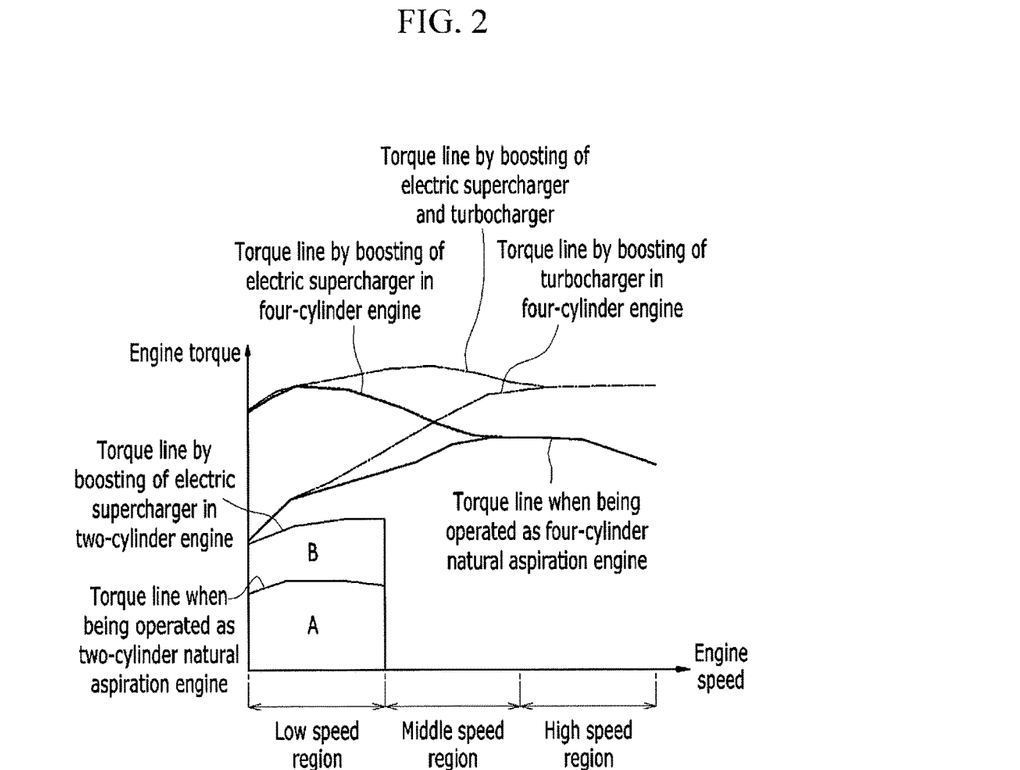
FIG. 2 is a graph showing a driving region according to an exemplary embodiment of the present invention.

FIG. 2 is a graph showing a driving region according to an exemplary embodiment of the present invention. In FIG. 2, a horizontal axis represents an engine rotation speed, and a vertical axis represents an engine torque.

In FIG. 2, a solid line is a torque line when the engine is operated as a naturally aspirated engine, a dotted line is a torque line found through boosting of the electric supercharger 50, a one-point chain line is the torque line found through boosting of the turbocharger 40, and a two-point chain line is the torque line found through boosting of the electric supercharger 50 and the turbocharger 40.

Referring to FIG. 2, the CDA device 20 is operated in a low speed region where the rotation speed of the engine is relatively small to deactivate the second combustion chamber 12 and the third combustion chamber 13. Since the second combustion chamber 12 and the third combustion chamber 13 are deactivated, the exhaust gas is not exhausted through the first exhaust manifold 31 connected to the second combustion chamber 12 and the third combustion chamber 13, the turbocharger 40 is not operated.

Accordingly, the engine 10 is operated as a two-cylinder engine, the supercharged air is supplied to the first combustion chamber 11 and the fourth combustion chamber 14 through the electric supercharger 50.

Also, since the exhaust gas of the first combustion chamber 11 and the fourth combustion chamber 14 does not pass through the turbocharger 40 and the exhaust gas is exhausted to the main exhaust line 30 through the second exhaust manifold 35 and the second exhaust line 37, back pressure may be reduced. Accordingly, a compression ratio of the first combustion chamber 11 and the fourth combustion chamber 14 may be increased, improving the fuel consumption.

Since the supercharged air is supplied to the first combustion chamber 11 and the fourth combustion chamber 14 through the electric supercharger 50, it may be confirmed that the driving region (referring to a display part 'B' of FIG. 2) by the boosting of the electric supercharger 50 is extended rather than the driving region (referring to a display part 'A' of FIG. 2) when the two-cylinder engine is operated as the natural intake engine in the low speed region.

That is, a region A of FIG. 2 is a region that the engine is operated as the naturally aspirated engine, and in the instant case, the engine torque may be controlled through the opening of the throttle valve 64. A region B of FIG. 2 is a region in which the engine torque of the engine is controlled by the boosting of the electric supercharger.

Also, the CDA device 20 is not operated in a low speed and high load region such that the engine is operated as the four-cylinder engine. In the instant case, since the supercharged air is supplied to the combustion chamber through the electric supercharger 50, the driving region may extended. Because the engine is operated as the four-cylinder engine, the turbocharger 40 is also operated, however the exhaust gas amount exhausted from the first combustion chamber 11 and the fourth combustion chamber 14 is not large in the low speed region such that boosting by the turbocharger 40 is limited.

In a middle speed region in which the rotation speed of the engine is higher than in the low speed region, the CDA is not operated and the engine 10 is operated as the four-cylinder engine.

Accordingly, the turbocharger 40 is operated by the exhaust gas exhausted from the first combustion chamber 11 and the fourth combustion chamber 14 and the turbocharged air is supplied to the combustion chamber by the turbocharger 40. Further, the supercharged air is supplied to the combustion chamber by the electric supercharger 50.

That is, in the middle speed region, the boosting is realized by the turbocharger 40 and the electric supercharger 50.

In a high speed region in which the rotation speed of the engine is higher than in the middle speed region, the CDA is not operated and the engine 10 is operated as the four-cylinder engine.

Accordingly, the turbocharger 40 is operated by the exhaust gas exhausted from the first combustion chamber 11 and the fourth combustion chamber 14 and the turbocharged air is supplied to the combustion chamber by the turbocharger 40.

That is, the boosting is realized by the turbocharger 40 in the high speed region.

In a case of a conventional turbocharger 40, a flow amount of the exhaust gas is increased in the high speed region such that the turbine 41 is rotated faster than an allowable limit such that an overload problem of the turbine 41 is generated. To solve this problem, a wastegate valve is used to bypass a portion of the exhaust gas exhausted from the combustion chamber of the engine 10. In this case, about half of the exhaust gas exhausted from the combustion chamber of the engine 10 bypasses the turbine 41.

However, in the engine system according to an exemplary embodiment of the present invention, only two combustion chambers (the second combustion chamber 12 and the third combustion chamber 13) are connected to the turbine 41 of the turbocharger 40 such that it is not necessary to bypass the exhaust gas supplied to the turbine 41 of the turbocharger 40 in the high speed region. Accordingly, the waste gate valve used in the conventional turbocharger 40 may be omitted, thereby reducing the manufacturing cost of the vehicle.

Next, the driving region in which the recirculation gas supply is possible according to the conventional art and the driving region in which the recirculation gas supply of the engine system is possible according to an exemplary embodiment of the present invention are described in detail.

Figure 3:
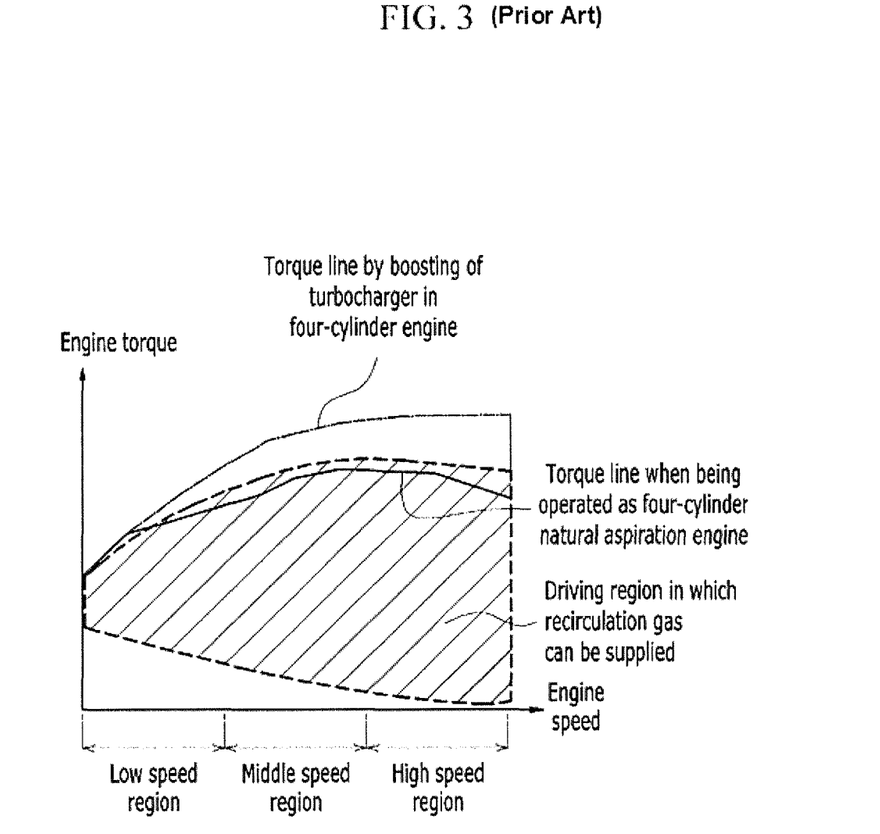
FIG. 3 is a graph showing a driving region capable of supplying a recirculation gas according to a conventional art.

FIG. 3 is a graph showing a driving region in which recirculation gas supply is possible.

To inflow the recirculation gas from the recirculation line 91 to the intake line 60, a upstream portion pressure of the EGR valve 95 may be larger than a downstream portion pressure thereof. The driving region in which the recirculation gas may be inflowed by a differential pressure condition is determined, a high load driving condition in which the combustion stability is poor by the recirculation gas is excluded, and the EGR driving region in which the recirculation gas may be supplied is finally determined.

According to the conventional art, the recirculation line is branched from the downstream portion of the exhaust gas processing device and is joined to the intake line of the upstream portion of the compressor of the turbocharger, and the EGR valve is mounted at the recirculation line.

The downstream portion of the EGR valve is exposed to atmosphere such that a downstream portion pressure of the EGR valve is closer to atmospheric pressure. Accordingly, in the low and middle speed/low load region in which the downstream portion pressure of the exhaust gas processing device as the upstream portion of the EGR valve is similar to atmospheric pressure, the differential pressure of the upstream portion and the downstream portion of the EGR valve is close to 0 such that it is difficult for the recirculation gas to be supplied.

Also, since the combustion stability is poor by the recirculation gas in the partial high load region, a region in which the recirculation gas may be applied in the driving region may appear like a hatched region shown in FIG. 3.

Figure 4:
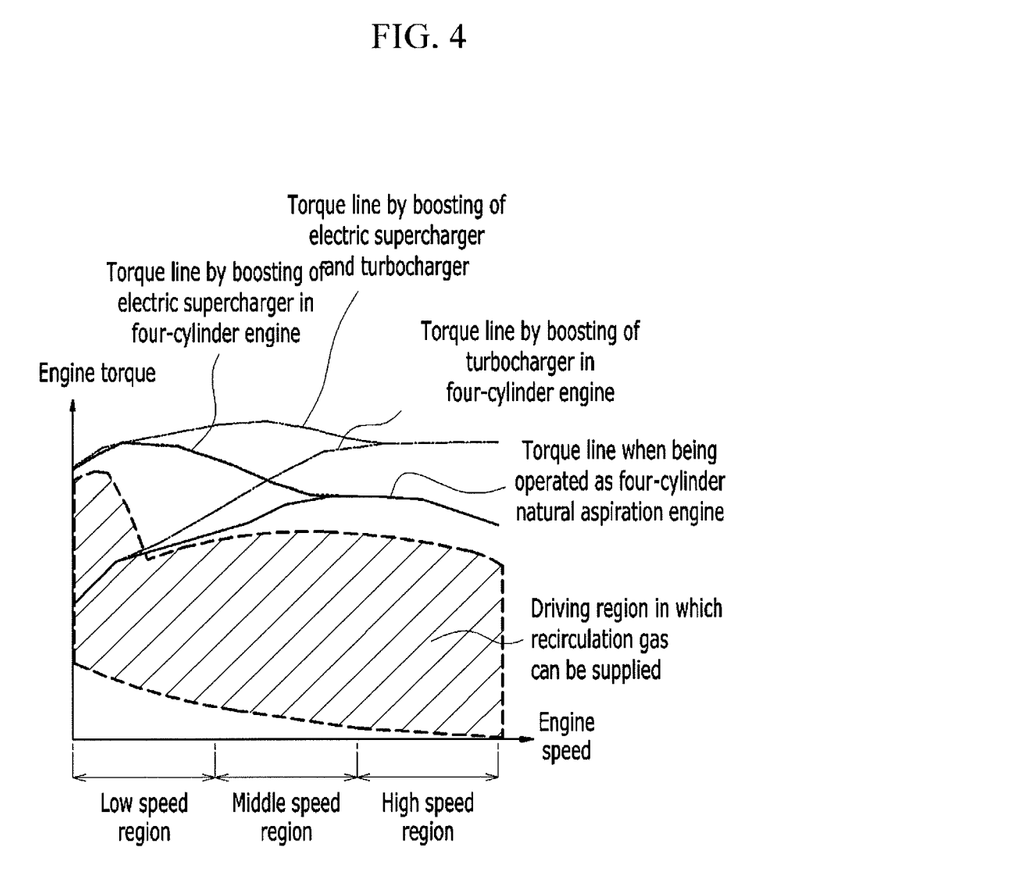
FIG. 4 is a graph showing a driving region capable of supplying a recirculation gas according to an exemplary embodiment of the present invention.

However, as shown in FIG. 4, according to an exemplary embodiment of the present invention, since the EGR valve 95 is mounted at the upstream portion of the electric supercharger 50 mounted at the upstream portion of the throttle valve 64, the inflow of the recirculation gas is possible in the turbocharged period of the turbocharger 40 in which the downstream portion pressure of the EGR valve 95 is higher than the upstream portion pressure of the EGR valve 95.

However, in the low and middle speed/high load driving region in which the fuel consumption improvement is required, the supply of the recirculation gas is possible, the supplied recirculation gas may be supercharged through the electric supercharger 50, compared with the conventional art, and the driving region (referring to the hatched region of FIG. 4) capable of supplying the recirculation gas may be expanded in the low and middle speed/high load region.

Next, the engine system according to various exemplary embodiments of the present invention will be described with reference to accompanying drawings.

Figure 5:
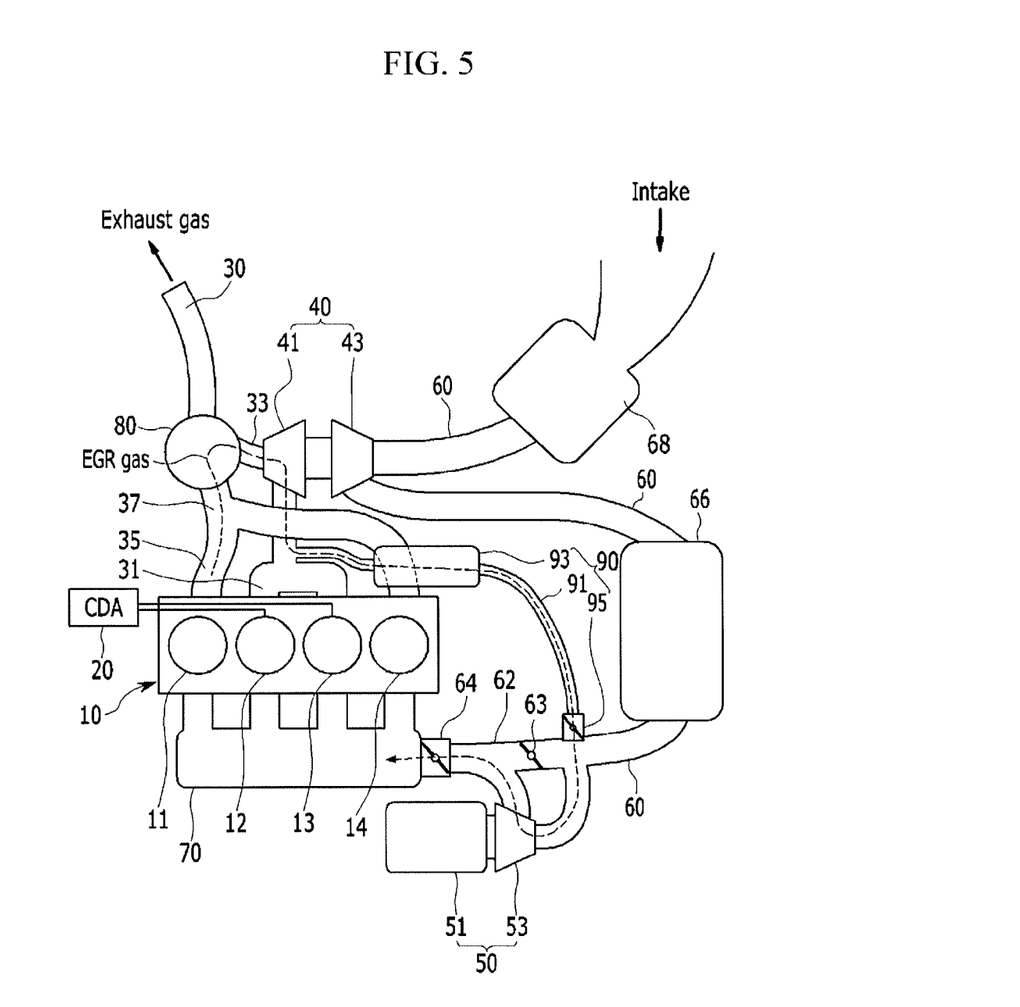
FIG. 5 is a schematic view showing a configuration of an engine system according to various exemplary embodiments of the present invention.

FIG. 5 is a schematic view showing a configuration of an engine system according to various exemplary embodiments of the present invention.

A base configuration of the engine system according to the various exemplary embodiments of the present invention is the same as the configuration of the engine system according to the various exemplary embodiments. However, the configuration of the recirculation line 91 is partially different from that of the various exemplary embodiments. Accordingly, hereinafter, the different configuration from that of the various exemplary embodiments is described in detail. Also, the operation of the various exemplary embodiments of the present invention is the same as the operation of the above-described various exemplary embodiments of the present invention.

As shown in FIG. 5, the engine system according to the various exemplary embodiments of the present invention includes the engine 10, the intake line 60, the throttle valve 64, the CDA device 20, the exhaust manifold, the turbocharger 40, the electric supercharger 50, and the exhaust gas recirculation device 90.

The configurations of the engine 10, the intake line 60, the throttle valve 64, the CDA device 20, the exhaust manifold, the turbocharger 40, and the electric supercharger 50 are the same as in the above-described various exemplary embodiments. However, the configuration of the recirculation line 91 is partially different among the exhaust gas recirculation device 90. Next, the configuration of the exhaust gas recirculation device 90 according to the various exemplary embodiments of the present invention will be described in detail.

The exhaust gas recirculation device 90 includes the recirculation line 91 flowing the part (recirculation gas) of the exhaust gas exhausted from the combustion chamber, the EGR cooler 93 mounted at the recirculation line 91, and the EGR valve 95 controlling the recirculation gas amount.

The recirculation line 91 is branched from the first exhaust manifold 31 connected to the combustion chamber mounted with the CDA device 20 or the first exhaust line 33 and is joined to the intake line 60, and preferably, is joined at the intake line 60 of the upstream portion (upstream side) of the electric compressor 53 mounted at the intake line 60.

The EGR cooler 93 cools the recirculation gas flowing to the recirculation line 91 to be supplied to the combustion chamber.

As the EGR valve 95 is mounted at the part where the recirculation line 91 and the intake line 60 are joined, the distance between the EGR valve 95 and the combustion chamber may be minimized. As described above, when the distance between the EGR valve 95 and the combustion chamber is minimized, the time delay when controlling the recirculation gas amount by the controller (e.g., the engine control unit) is minimized such that the control responsiveness is improved.

Further, because the recirculation line 91 is not branched from the downstream portion (downstream side) of the exhaust gas processing device 80 but is branched from the first exhaust line 33 of the upstream portion (upstream side) of the turbine 41 or the downstream portion (downstream side) of the exhaust manifold, the path of the recirculation line 91 is shortened, simplifying a layout of the engine compartment.

When the CDA device 20 is not operated and the engine is operated as the four-cylinder engine, the part (the recirculation gas) of the exhaust gas exhausted from the second combustion chamber 12 and the third combustion chamber 13 is supplied to the first combustion chamber 11 and the fourth combustion chamber through the recirculation line 91. In the instant case, the back pressure of the second combustion chamber 12 and the third combustion chamber 13 may be reduced such that abnormal combustion including knocking may be prevented from being generated.

When the CDA device 20 is operated such that the second combustion chamber 12 and the third combustion chamber 13 are deactivated and the first combustion chamber 11 and the fourth combustion chamber 14 are operated as the two-cylinder engine, the part (the recirculation gas) of the exhaust gas exhausted from the first combustion chamber 11 and the fourth combustion chamber 14 may be resupplied to the first combustion chamber 11 and the fourth combustion chamber 14 via the exhaust gas processing device 80, the turbine 41 of the turbocharger 40, and the exhaust gas recirculation device 90.

In detail, when the CDA device 20 is operated such that the second combustion chamber 12 and the third combustion chamber 13 are deactivated, the supercharged air is supplied to the first combustion chamber 11 and the fourth combustion chamber 14 by the electric supercharger 50 such that the pressure of the downstream portion of the electric supercharger 50 is higher than the pressure of the upstream portion. That is, since the back pressure is generated at the intake line 60 of the upstream portion of the electric supercharger 50 by the operation of the electric supercharger 50, the part of the exhaust gas exhausted from the first combustion chamber 11 and the fourth combustion chamber 14 flows through the turbine 41 in a reverse direction and is resupplied to the first combustion chamber 11 and the fourth combustion chamber 14 through the recirculation line 91.

As described above, even when the second combustion chamber 12 and the third combustion chamber 13 are deactivated, the recirculation gas may be supplied to the first combustion chamber 11 and the fourth combustion chamber 14.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine system comprising:
an engine including a plurality of combustion chambers generating a driving torque by combustion of a fuel;
an intake line flowing an intake gas supplied to the combustion chambers;
an intake manifold distributing the intake gas flowing through the intake line into the plurality of combustion chambers;
a throttle valve provided at a front of the intake manifold and controlling an air amount supplied to the combustion chambers;
a supercharger provided at an upstream portion of the throttle valve and including a motor and a compressor operated by the motor to supply the supercharged air to the combustion chambers;
an exhaust gas processing device purifying an exhaust gas generated in the combustion chambers;
an exhaust gas recirculation device including a recirculation line branched from a downstream portion of the exhaust gas processing device and joined to the intake line of the upstream portion of the electric compressor, an exhaust gas recirculation (EGR) cooler mounted at the recirculation line, and an EGR valve mounted at a place where the recirculation line and the intake line are joined;
a cylinder deactivation (CDA) device mounted at a portion of the combustion chambers among the plurality of combustion chambers and selectively deactivating the portion of the combustion chambers;
a first exhaust manifold connected to the combustion chambers mounted with the CDA device;
a second exhaust manifold connected to the combustion chambers without the CDA device; and
a turbocharger including a turbine rotated by exhaust gas exhausted through the first exhaust manifold and a compressor rotated in connection with the turbine to compress external air,
wherein a first exhaust line connected to the first exhaust manifold and a second exhaust line bypassing the turbocharger and connected to the second exhaust manifold are joined to a main exhaust line, and
wherein the exhaust gas processing device is provided at the main exhaust line.

2. The engine system of claim 1, wherein
the combustion chambers include a first combustion chamber, a second combustion chamber, a third combustion chamber, and a fourth combustion chamber, and
the CDA device is mounted at the second combustion chamber and the third combustion chamber.

3. The engine system of claim 1, wherein the turbine is mounted at the first exhaust line flowing the exhaust gas exhausted from the first exhaust manifold.

4. The engine system of claim 1, wherein
a bypass line partially bypassing air supplied to the electric supercharger is provided at the intake line, and
a bypass valve is mounted at the bypass line.

5. The engine system of claim 1, wherein
the CDA device is configured to be operated in a low speed region to deactivate the combustion chambers.

6. An engine system comprising:
an engine including a plurality of combustion chambers generating a driving torque by combustion of a fuel;
an intake line flowing an intake gas supplied to the combustion chambers;
a throttle valve provided at a front of the intake manifold and controlling an air amount supplied to the combustion chambers;
a cylinder deactivation (CDA) device mounted at a portion of the combustion chambers among the plurality of combustion chambers and selectively deactivating the portion of the combustion chambers;
a first exhaust manifold connected to the combustion chambers mounted with the CDA device;
a second exhaust manifold connected to the combustion chambers without the CDA device;
a turbocharger including a turbine rotated by the exhaust gas exhausted through the first exhaust manifold and a compressor rotated in connection with the turbine to compress external air;
an electric supercharger provided at a upstream portion of the throttle valve and including a motor and an electric compressor operated by the motor to supply air to the combustion chambers; and
an exhaust gas recirculation device including a recirculation line branched from the first exhaust manifold and joined at the upstream portion of the electric compressor mounted at the intake line, an EGR cooler mounted at the recirculation line, and an EGR valve mounted at a place where the recirculation line and the intake line are joined,
wherein a first exhaust line connected to the first exhaust manifold and a second exhaust line bypassing the turbocharger and connected to the second exhaust manifold are joined to a main exhaust line, and
wherein an exhaust gas processing device purifying the exhaust gas generated in the combustion chambers is provided at the main exhaust line.

7. The engine system of claim 6, wherein
the combustion chambers include a first combustion chamber, a second combustion chamber, a third combustion chamber, and a fourth combustion chamber, and
the CDA device is mounted at the second combustion chamber and the third combustion chamber.

8. The engine system of claim 6, wherein
a bypass line partially bypassing air supplied to the electric supercharger is provided at the intake line, and
a bypass valve is mounted at the bypass line.

9. The engine system of claim 6, wherein
the CDA device is configured to be operated in a low speed region to deactivate the combustion chambers.

10. The engine system of claim 6, wherein the first exhaust manifold is connected to the turbocharger through the first exhaust line.

11. The engine system of claim 10, wherein the turbine of the turbocharger is mounted at the first exhaust line flowing the exhaust gas exhausted from the first exhaust manifold.

* * * * *